Patented Sept. 29, 1942

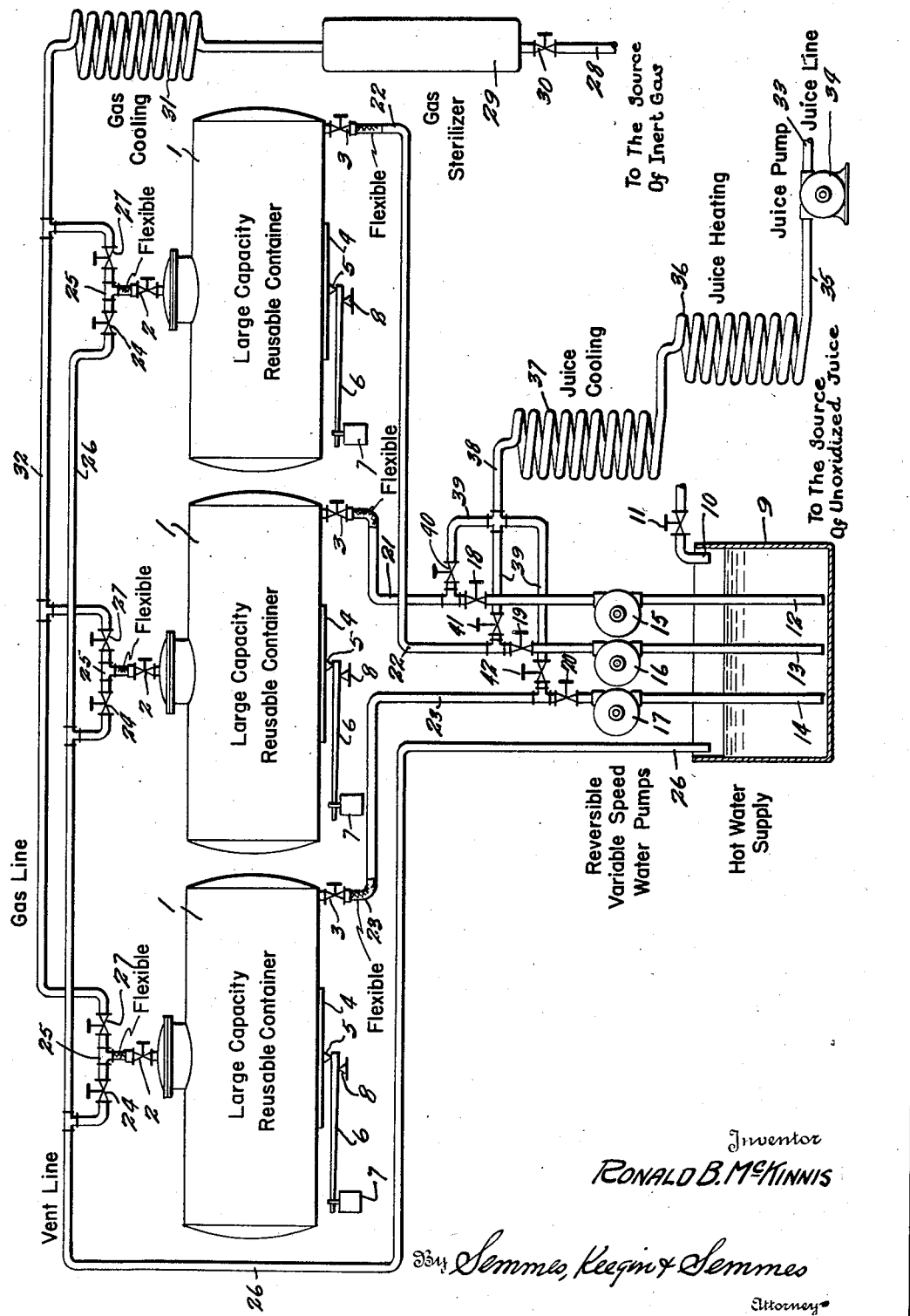

2,297,190

UNITED STATES PATENT OFFICE 2,297,190

APPARATUS FOR PACKAGING LIQUIDS

Ronald B. McKinnis, Winter Haven, Fla.

Application October 11, 1939, Serial No. 299,023

7 Claims. (Cl. 226—68)

My invention relates to packaging liquids, and more particularly it relates to the packaging of sterile liquids, such as unoxidized sterile juices of fruits and vegetables, for instance orange juice or grapefruit juice.

In my co-pending application Serial No. 299,022 filed October 11, 1939, I have shown a method and apparatus for packaging sterile unoxidized liquid, such as orange juice, in a re-usable container.

The present apparatus is an improvement on that shown in the above identified co-pending application, and enables a plurality of containers to be filled at the same time with concurrent economies in the operation.

An object of my invention is to provide a system for filling large capacity re-usable containers with sterile unoxidized liquids, such as citrous fruit juices, which is simple to operate, and easy to repair and replace.

Another object of the invention is to conserve the sterilizing liquid and inert gas.

Yet another object of the invention is to permit the filling of a plurality of large capacity re-usable containers in a short space of time.

A further object of my invention is to provide a system such that juice extractors and the apparatus for pasteurization of the juices can work continuously. The sterilizing, filling with inert gas, and the introduction of the juice can be proceeding while one of the containers is being removed. Each container may be operating on a different cycle. For instance, while one is being filled with hot water for sterilization, another may be being filled with inert sterilized gas.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

The single figure of the drawing diagrammatically illustrates a system for filling large capacity containers with the liquid which is sterile, and which is unoxidized.

The system is of particular use, as above stated, in storing and shipping citrous fruit juices, which may be extracted under the conditions set forth in my co-pending application, Serial No. 224,388, filed August 11, 1938.

In order to utilize to the maximum the hot water supply, I provide variable speed pumping means so that the volume of hot sterilizing liquid delivered to any one re-fillable container may be balanced in accordance with the amount of hot water available.

My system comprises a series of large capacity re-usable containers 1 having valves 2 and 3. The arrangement is such that the valves 2 and 3, when the containers 1 are filled with fruit juice, can be closed and the containers removed from the system for shipping or storing.

Each container is adapted to rest on a base 4 formed with a support 5 which rests on a scale beam 6 provided with a movable weight 7 for adjusting the scale to any desired weight. The scale beam is fulcrumed on a support 8. The adjustment of the weight along the length of the arm 6 enables it to be tilted when each re-usable container has been filled to the desired amount.

I have shown in the drawing a source of hot water supply 9, fed by a hot water pipe 10, controlled by a valve 11. Adapted to draw hot sterilizing water from the hot water supply 9 are pipes 12, 13 and 14. Water is sucked through the pipes 12, 13 and 14 by reversible variable speed pumps 15, 16 and 17, respectively.

These pumps in the first cycle of my operation are adapted to feed hot sterilizing water through valves 18, 19 and 20 to lines 21, 22 and 23 which lead to the containers 1.

By causing the pumps 15, 16 and 17 to pump hot water through the lines 21, 22 and 23 and valves 3 to the containers 1, the containers 1 may be filled with hot water and sterilized. In this filling operation the valves 2 are opened, and valves 24 and headers 25 are likewise opened. The valves 24 control the flow of the hot sterilizing liquid to a vent line 26 which feeds back at its lower end into the source 9 of hot water supply. The valves 27 in the headers 25 are closed during this filling operation. Thus all air and gas in the apparatus and lines are purged out with the hot water and the lines and apparatus are sterilized.

The next step is to fill the lines and apparatus with a sterile non-oxidizing gas displacing the water. I have shown a pipe 28 leading from the gas supply source to a gas sterilizer 29 through a valve 30. The supply may be any inert non-oxidizing gas, such as carbon dioxide or nitrogen. The gas is sterilized by a sterilizer 29 and passes to a cooling coil 31, which is shown diagrammatically in the single figure of the drawing. From the cooling coil 31 the gas flows through a line 32, and through valves 27 which are now open, the valves 24 having been closed, through the headers 25 and valves 2 into the containers 1.

The variable speed pumps 15, 16 and 17 have been reversed and pump the sterilizing water back through lines 21, 22 and 23, and into the hot water tank 9. This hot water passes out of the tanks 1 in front of the cool sterile non-oxidizing gas.

When the tanks 1 and the lines 21, 22 and 23 have had the water removed from them, and are filled with the inert gas, the valves 18, 19 and 20 are closed. From a suitable source of supply (not shown) through a pipe 33, a sterile non-oxidized liquid, such as orange juice, is drawn, and is pumped by means of a juice pump 34 through a line 35 and a heating coil 36. Here the juice may be sterilized, if it has not been previously sterilized. From the heating coil 36 the juice is pumped through a cooling coil 37 and a line 38 into a header 39. From the header 39, through valves 40, 41 and 42, the sterile unoxidized juice is pumped, respectively, into lines 21, 22 and 23. The valves 18, 19 and 20 are closed during this operation, as before explained.

The juice passes through lines 21, 22 and 23 into the containers 1 until they are filled to the desired level, at which time the scale beam will indicate that the correct weight of juice has been discharged into the tank. Valves 3 and 2 are shut and the containers 1 can be removed for storage or shipment.

I have described the construction and operation of my system in detail, but in summary it can be said that the reversible variable speed pumps 15, 16 and 17 in the sterilizing cycle pump hot water into the tanks 1 until the tanks 1 are filled, and the vent line 26 discharges hot water back into the hot water supply tank 9.

The next cycle is one in which the tanks are filled with juice which has been sterilized and cooled. The juice pump 34 moves the juice through the lines 21, 22 and 23 into the tanks 1, driving out through valves 2, headers 25, valves 24 and vent line 26, the sterile inert gas. When the tanks have been filled to the desired amount, as indicated by the scale beams, the valves 2 and 3 are shut, and the tanks can be removed from the system.

Alternately the gas can be discharged from the header 25 through valve 27 to gas line 32 and back to storage, thus conserving the gas supply.

The system I have described is flexible, and one, two or more tanks can be filled at one time by manipulation of the valves in the headers 25. Moreover the rate at which the tanks 1 can be filled with the hot water is individually controllable through the reversible variable speed pumps 15, 16 and 17. Where only one tank, for instance, is to be filled, the speed of the pump can be greatly increased, as the operating conditions permit such accentuated rate of pumping over that which exists when a plurality of containers are to be filled.

The variable speed water pumps are designed not only to regulate the speed of admission of water, but the speed of withdrawal as well, so that the rate of withdrawal of water may be definitely correlated to the gas supply.

Each of the containers 1 must, after filling to the desired level, be subjected to a sufficient pressure of inert gas so that the solution of the gas in the juice will not create an objectionably high vacuum. Carbon dioxide is highly soluble; nitrogen is soluble to a much smaller degree. I may employ nitrogen, or a mixture of nitrogen and carbon dioxide, thus making it unnecessary to introduce as high a pressure of gas into the juice container as would be the case if I employed carbon dioxide alone.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In an apparatus for packaging sterile unoxidized liquid in re-usable storage containers, a source of hot sterilizing liquid, conduits connecting the containers with the source of sterilizing liquid, a vent conduit connected with the containers and in communication with the source of hot sterilizing liquid, a source of sterile inert gas, a line for the gas in communication with the containers, a source of sterile unoxidized liquid connected to the hot sterilizing liquid conduits, and valves in said sterilizing liquid conduits and the vent conduit whereby admission of the hot sterilizing liquid and the sterile unoxidized liquid into the containers may be regulated.

2. In an apparatus for packaging sterile unoxidized liquid in re-usable storage containers, a source of hot sterilizing liquid, conduits connecting the containers with the hot sterilizing liquid, a vent conduit connected with the containers and in communication with the source of hot sterilizing liquid, a source of sterile inert gas, a gas conduit in communication with the source of supply and the containers, a source of sterile unoxidized liquid connected to the conduits for the hot sterilizing liquid, valves in said conduits whereby the admission of the hot sterilizing liquid and the sterile unoxidized liquid into the containers may be regulated, and separate means to indicate when each container has been filled with the sterile unoxidized liquid to a predetermined point.

3. In an apparatus for packaging citrus juices in re-usable storage containers, a source of hot sterilizing liquid, conduits connecting the source of hot sterilizing liquid to the containers, a vent line connected with the containers and in communication with the source of hot sterilizing liquid, a source of sterile inert gas, a conduit from the source of gas to said containers, a supply of citrus juice in communication with the conduits for the hot sterilizing liquid, a heater for the juice, and valves in each of said conduits to regulate the admission of the sterilizing liquid and juice into the containers.

4. In an apparatus for packaging citrus juice in re-usable storage containers, a source of hot sterilizing liquid, conduits connecting the containers to the source of sterilizing liquid, a vent line connected with the containers and in communication with the source of hot sterilizing liquid, a supply of sterile inert gas and a line connecting the gas supply with the containers, a source of citrus juice, means to subject the juice to a heating step and additional means to cool the juice, said juice supply being in communication with the conduits for the hot sterilizing liquid, and valves in said conduits to regulate the admission of the hot sterilizing liquid and citrus juice to the containers.

5. In an apparatus for packaging citrus juices in re-usable storage containers, a source of hot sterilizing liquid, conduits connecting the containers with the source of sterilizing liquid, a vent line connected to the containers and in communication with the source of sterilizing liquid, a supply of sterile inert gas and means to connect the gas with the containers, a source of citrus juice, a heater for the citrus juice, means to connect the source of citrus juice with the conduits for the hot sterilizing liquid, valves in said conduits whereby the admission of the sterilizing liquid and citrus juice into the containers may be regulated, and means to indicate when the containers have been filled with the citrus juice to a predetermined amount.

6. In an apparatus for packaging citrus juice into re-usable containers, a source of hot sterilizing liquid, conduits connecting the containers with the source of sterilizing liquid, a variable speed pump in each of said conduits to force the sterilizing liquid into the containers, a vent line connected with the containers and in communication with the sterilizing liquid, a source of sterile inert gas, and means to connect the gas with the containers, a source of citrus juice, said source of juice being connected to the conduits for the hot sterilizing liquid, and valves in said conduits whereby the admission of the hot sterilizing liquid and the juice to the containers may be regulated.

7. In an apparatus for packaging citrus juice into re-usable containers, a source of hot sterilizing liquid, conduits connecting the containers with the source of sterilizing liquid, a variable speed pump in each of said conduits to force the sterilizing liquid into the containers, a vent line connected with the containers and in communication with the sterilizing liquid, a source of sterile inert gas, and means to connect the gas with the containers, a source of citrus juice, said source of juice being connected to the conduits for the hot sterilizing liquid, valves in said conduits whereby the admission of the hot sterilizing liquid and the juice to the containers may be regulated, and separate means to indicate when each container has been filled with the juice to a predetermined point.

RONALD B. McKINNIS.